Figure 1:
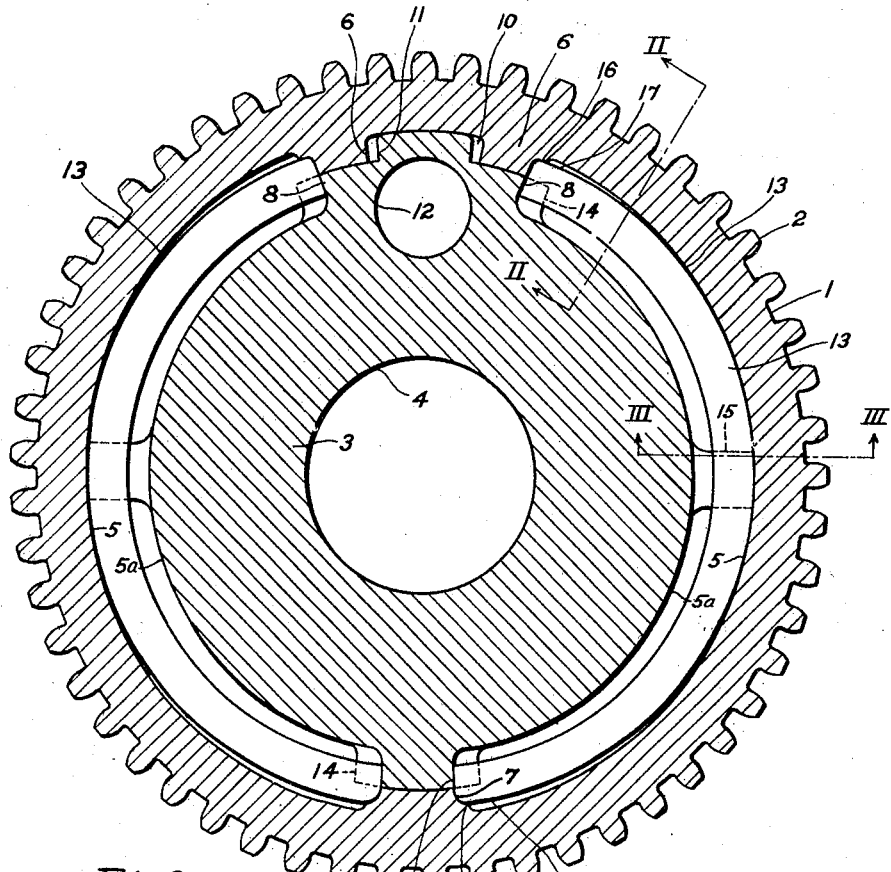

Sept. 24, 1929.  C. BETHEL  1,729,435
FLEXIBLE GEAR WHEEL
Filed Nov. 5, 1925

WITNESSES:
C. J. Weller.
Wm B. Jaspert.

INVENTOR
Claude Bethel.
BY Wesley G. Carr
ATTORNEY

Patented Sept. 24, 1929

1,729,435

UNITED STATES PATENT OFFICE

CLAUDE BETHEL, OF WILKINSBURG, PENNSYLVANIA, ASSIGNOR TO WESTINGHOUSE ELECTRIC AND MANUFACTURING COMPANY, A CORPORATION OF PENNSYLVANIA

FLEXIBLE GEAR WHEEL

Application filed November 5, 1925. Serial No. 67,023.

My invention relates to gear-wheels, more particularly to gear-wheels embodying flexible elements to permit relative movement between the gear tooth elements and the supporting wheel or hub structure.

It is among the objects of my invention to provide a flexible gear-wheel of simple and durable mechanical construction comprising a minimum number of parts.

Another object of my invention is to provide a gear-wheel of the above-designated character in which the flexible element shall be of novel construction and so designed as to be practically indestructible, when utilized in the manner that will be hereinafter set forth.

Another object of my invention is to provide a flexible gear-wheel in which the several co-operating elements are arranged to eliminate special mounting fixtures and retaining bolts, which were the cause of frequent breakage in structures heretofore utilized.

Various forms of flexible gear-wheels have been employed embodying spring elements designed to protect the tooth elements or the apparatus with which the gear-wheel was associated, from shock and impact to which a drive mechanism is customarily subjected. The spring structures have mostly been of a complicated form, or the manner of securing the spring element to the wheel member has involved a complex structure, which led to difficulties in the operation of the gear member or greatly enhanced the cost of manufacturing and assembling the same.

My present invention is directed to a flexible gear-wheel of simplified construction, in which the spring elements are disposed and arranged with respect to the co-operating rim and gear center in such manner as to provide maximum resilience within a limited movement of the rim, and in which the spring elements are of such form as to practically entirely eliminate the possibility of breakage. The gear structure is furthermore designed to facilitate the assembly of the rim and support, including the spring elements, which are disposed in spaces provided in the rim and support without the necessity of employing mounting brackets or spring seats, such as were employed in prior devices.

In practicing my invention, I utilize springs which are substantially segments of an annulus. The spring members are disposed in the gear-wheel to deflect tangentially only and are restrained against lateral movement. With my improved design of gear-wheel it is possible to obtain a toothed rim of minimum cross section and provisions may be made for securing a predetermined amount of deflection of the spring elements, in accordance with the service requirements and consistent with the operating conditions to which the gear member is subjected.

In the accompanying drawings, constituting a part hereof and in which like reference characters designate like parts, Figure 1 is a view, in cross-section, of a flexible gear-wheel embodying the principles of my invention.

Figure 2:
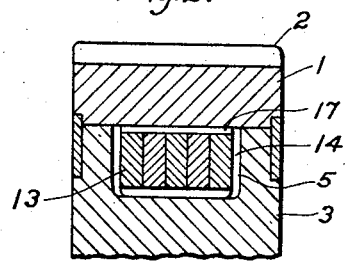
Figure 3:
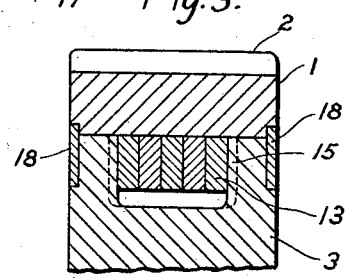
Figure 4:
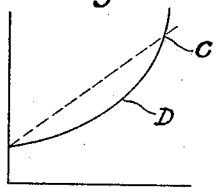

Fig. 2 is a transverse sectional view thereof taken along the line II—II, Fig. 1, Fig. 3 is a similar view taken along the line III—III, Fig. 1, and Fig. 4 is a diagrammatic view graphically illustrating the characteristic of the spring members.

With reference to the figures of the drawing, the structure therein illustrated comprises a gear rim 1 having a toothed outer periphery 2, which is mounted upon a center or supporting hub member 3 having a central opening 4 therein constituting the seat by means of which the gear-wheel is mounted. The rim and center 1 and 3 are respectively provided with recessed portions 5 and 5a, which are constituted by the co-ordination of a plurality of inwardly extending lugs 6 and 7 on the rim member and projecting lugs 8 and 9 on the gear center. A transverse slot 10 is provided in the rim 2 between the two lugs 6, and a projecting tongue or lug 11 that is adapted to interact with the slot 10 is provided on the center 3. A crank-pin opening 12 is provided near the lug 11 in the gear center, if desired, whereby the gear-wheel may be operatively connected to one or more driven elements by a connecting rod.

Referring to Figs. 2 and 3 of the drawing, a plurality of flat curved spring elements 13 are disposed in side-by-side relation in the spaces 5 and 5a between the rim and gear center. Instead of the plurality of spring members 13, a single spring member of increased proportions may be utilized. The spring members 13 are retained in proper working alinement by projecting lugs or tongues 14 and 15.

The lug members 6 and 7 are provided with offsets or shoulders 16, Fig. 1, for receiving the ends of the spring 13, the object of the offset portions being to provide four tapering spaces 17 between the gear rim and the outer faces of the springs. A pair of retaining plates or rings 18 are provided on the side faces of the rim 1 and gear center 3 to prevent access of foreign matter to the spring elements and to constitute the space in which they are retained a lubricating chamber.

In Fig. 4 I have graphically illustrated the characteristics of the annular spring elements 13 and of the helical and leaf spring structures utilized in prior art devices. C designates a curve showing the straight line relation between load and deflection of the coil and leaf spring elements, and D designates the rising characteristic or load-deflection curve of the annular springs 13 that are embodied in my present invention. The rising spring characteristic is quite important in flexible gear-wheels as will be hereinafter explained.

The operation of this device, and particularly of the spring element, is briefly as follows: The gear rim member 1 is engaged by a toothed pinion element (not shown) at its outer periphery, and torque is transmitted through the rim and through the lugs 6 and 7 to the spring elements 13 and the projecting lugs 8 and 9 of the gear center 3. When the spring members 13 are subjected to a compressive load on account of their engagement with the lugs of the gear rim and gear center, they will deflect tangentially to the required degree, within the limits of the spaces 17 between the rim and spring, inasmuch as they are restrained from movement in any other direction, as is apparent from the figures of the drawings.

This deflection takes place by the spring elements 13 bending in such manner that they conform to the inner surface of the gear rim 1 to an extent depending upon the torque being transmitted by the gear-wheel. At low torques the springs are in contact with the rim 1 over a relatively short distance at their center portions and are free to deflect throughout the remainder of their lengths. When high torques are transmitted the spring elements are forced into conformation with the rim over a greater portion of their lengths and the effective or free spring lengths are thus reduced, the springs being free to deflect by bending throughout only the portions not already in contact with the rim. At very high or limiting torques the springs will be forced into contact with the rim throughout substantially their entire lengths and will then be limited to deflect in direct compression only. This variation of the effective spring length in proportion to the torque being transmitted results in a flexible gear-wheel having the characteristics of springiness or large deflection per unit torque at low torques and of stiffness or small deflection per unit torque at high torques as shown by the load-deflection curve D Fig. 4. Flexible gear-wheels having these characteristics are very desirable in that they are very resilient at small loads and yet they do not deflect excessively at large loads nor do they become entirely rigid at some limiting load.

The degree of deflection or spring characteristic may be varied by the amount of space left between the rim and springs and also by the form of the faces of the lugs and the ends of the spring elements. It is obvious that any desired number of springs may be placed in a group and that any desired number of groups may be utilized in a single gear-wheel, and that but a single spring element may be utilized to provide a yielding connection between the rim and gear center.

One of the features of my present gear-wheel construction is the ease with which the spring members are assembled in the gear-wheel. This result is accomplished by placing the spring elements in side-by-side relation between the projections 8 and 9 and between the members 14 and 15 of the gear center and subsequently pressing the rim 1 thereover with the slot 10 in alinement with the tongue 11. The retaining plates 18 are then fitted in the annular grooves of the rim and center and the assembly of the gear-wheel is complete. Any suitable means for lubricating the spring elements may be employed.

It is evident from the foregoing description of my invention that flexible gear-wheels made in accordance therewith provide a mechanically simple and durable structure which is relatively inexpensive to manufacture; and it is further obvious that the utilization of a spring element, as set forth, provides desirable operating characteristics that have not been obtained in prior devices.

Although I have described a specific embodiment of my invention, it will be obvious to those skilled in the art that various modifications may be made in the details of construction, in the form and manner of assembling the spring elements and in the general arrangement and relation of the several cooperating parts without departing from the principles herein set forth.

I claim as my invention—

1. A flexible gear-wheel comprising a center portion, a rim portion and segmental spring elements cooperatively engaging the center and rim portions, said spring elements being adapted to be forced into conformation with the gear rim under tangential deflection in either direction.

2. A flexible gear-wheel comprising a center portion, a rim portion, cooperating lugs on said center and rim portions and a plurality of segmental spring elements disposed between said lugs and engaging the rim portion at all times at substantially mid-way between the lugs.

3. A flexible gear-wheel comprising a center portion, a rim portion and segmental spring elements disposed therebetween, said spring elements being adapted to deflect circumferentially in either direction by progressively conforming to the inner contour of the rim portion.

4. A flexible gear-wheel comprising a center portion having outwardly projecting lugs thereon, a rim portion having cooperating inwardly projecting lugs, and a plurality of segmental spring elements disposed between pairs of said cooperating lugs.

5. A flexible gear-wheel comprising a center portion, a rim portion and spring elements interposed between said center and rim portions, said spring elements having the shape of segments of an annulus of diameter less than the inside diameter of the gear rim and being adapted to deflect when torque is transmitted in either direction under compressive stresses to conform to the inside surface of the rim portion.

6. A flexible gear-wheel comprising a center portion, a rim portion, cooperating lugs on said center and rim portions, a plurality of segmental springs disposed between said center and rim portions, said springs engaging said lugs at their ends and being adapted to deflect under compressive stresses when torque is transmitted by the gear-wheel in either direction.

7. A flexible gear-wheel comprising a center portion, a rim portion, cooperating lugs on said center and rim portions, and segmental spring elements disposed between said center and rim portions, said spring elements having their ends in engagement with said lugs and their center portions in engagement with the inner surface of the rim portion at all times, in such manner that they may deflect by conforming to the inner contour of the rim under compressive stresses applied at their ends by said lugs.

8. A flexible gear-wheel comprising a center portion having radially extending lug members, a rim portion carried by the center having cooperating inwardly extending lug members that are adapted to bear upon the outer surfaces of the lug members on the center portion and spring elements having the form of sections of an annulus, the ends of said spring elements providing faces for engaging the lug members.

9. A flexible gear-wheel comprising a center portion, a rim portion carried by the center portion, a plurality of spring elements and means on the center and rim portions for engaging the ends of the spring elements to force the spring elements into engagement with the inner surface of the rim portion to an extent having a definite relation to the load when torque is transmitted by the gear-wheel in either direction.

10. The combination with a gear center, of a gear-rim carried by the gear center and segmental resilient members for transmitting torque between the gear center and the gear rim, said resilient members having radii shorter than the inner radius of the gear rim and being disposed to deflect by progressively conforming to the inner surface of the gear rim when loaded circumferentially in either direction.

11. A flexible gear-wheel comprising a hub, a gear rim carried by the hub, said hub and rim being each provided with lug members, and a plurality of spring elements each having the shape of a section of an annulus, the ends of which present faces for engaging both the lugs on the hub and the lugs on the rim, said spring elements being at all times in engagement with the inner surface of the rim at points substantially half way between the lugs on the rim.

12. A flexible gear-wheel comprising a hub, a gear rim carried by the hub, cooperating lugs on the hub and on the gear rim, and a plurality of spring elements, having the shape of sections of an annulus, said spring elements being disposed between the hub and the rim in such manner that, when no torque is being transmitted by the gear-wheel, each end of each of the spring elements will engage a lug on the hub and a lug on the rim and a portion of the spring substantially midway between the lugs on the rim will engage the inner surface of the rim, and when working torque is being transmitted by the gear-wheel in either direction, one end of each spring will become disengaged from a lug on the hub and the other end will become disengaged from a lug on the rim.

13. A flexible gear-wheel comprising, in combination, a hub, a gear rim carried by the hub, resilient members having the shape of sections of an annulus for transmitting force between the hub and the rim, said spring members, hub and rim being disposed about a substantially common axis, means provided on the resilient members for engaging the hub and the rim, and lugs provided on the hub and the rim for receiving the engaging means provided on the resilient members, said lugs being disposed to cause the resilient members to deflect by conforming progressively to the shape of the inner surface of the gear rim when force is being transmitted in either direction between the hub and the rim and to an extent bearing a definite relation to the force being transmitted.

14. A flexible gear-wheel comprising, in combination, a hub, a gear rim carried by the hub, resilient members having the shape of sections of an annulus for transmitting force between the hub and the rim, said resilient members, hub and rim being disposed about a substantially common center, means provided on the resilient members for engaging the hub and the rim, and lugs provided on the hub and the rim for receiving the engaging means on the resilient members, each of said resilient members being disposed to bear against the rim at all times at a portion other than the engaging means and to an extent depending on the magnitude of the force being transmitted.

15. A flexible gear-wheel comprising a hub, lug members on the hub, a gear rim carried by the hub and having cooperating lug members and spring elements having the shape of sections of an annulus having ends for engaging the lug members on the hub and the rim, said spring elements being so disposed between the hub and the rim that when no torque is being transmitted by the gear-wheel the ends of the spring elements will each engage a lug on the hub and a lug on the rim and a portion of each spring midway between its ends will engage the inner face of the gear rim.

In testimony whereof, I have hereunto subscribed my name this 21st day of October, 1925.

CLAUDE BETHEL.